United States Patent [19]

Campbell

[11] Patent Number: 5,290,444
[45] Date of Patent: Mar. 1, 1994

[54] COFFEE FILTER RETAINER

[76] Inventor: Alton Campbell, 156 Woodcliff Cir., Pineville, La. 71360

[21] Appl. No.: 62,245

[22] Filed: May 13, 1993

[51] Int. Cl.⁵ ............................................. B01D 29/085
[52] U.S. Cl. .................................. 210/473; 210/477; 210/479; 210/482; 99/295
[58] Field of Search ............... 210/473, 474, 477, 478, 210/479, 480, 481, 482; 99/295

[56] References Cited

U.S. PATENT DOCUMENTS

| | | | |
|---|---|---|---|
| 1,137,480 | 4/1915 | Gwynn | 210/473 |
| 2,555,766 | 6/1951 | Siczkiewicz | 210/478 |
| 2,684,624 | 7/1954 | Alvarez | 99/298 |
| 4,650,583 | 3/1987 | Bondanini | 210/474 |
| 4,656,932 | 4/1987 | Kopp | 99/295 |
| 4,666,724 | 5/1987 | DiLorenzo | 426/433 |
| 4,728,425 | 3/1988 | Sandvig | 210/477 |
| 4,735,719 | 4/1988 | Benedict | 210/474 |
| 4,739,697 | 4/1988 | Roberts | 210/474 |
| 4,865,737 | 9/1989 | McMichael | 210/477 |
| 4,885,987 | 12/1989 | Franke et al. | 99/295 |
| 4,963,262 | 10/1990 | Johnstone | 210/474 |
| 5,064,533 | 11/1991 | Anson | 210/232 |
| 5,176,830 | 1/1993 | Wiggins | 210/477 |

Primary Examiner—Robert A. Dawson
Assistant Examiner—W. L. Walker
Attorney, Agent, or Firm—Robert Montgomery

[57] ABSTRACT

A device for securing a coffee filter paper in a grounds container comprising a single thin sheet of thermo-plastic, heat resistant, resilient material having a plurality of fingers spaced symmetrically around the periphery, for placing adjacent a paper filter with its open central core at the center of the filter and in combination therewith wedged into a coffee grounds container with the instant invention exposed.

3 Claims, 1 Drawing Sheet

COFFEE FILTER RETAINER

BACKGROUND OF THE INVENTION

1. Field of the Invention

This invention is generally directed to coffee filter retainers and more particular to filter paper stabilizing rings and the like which serve to maintain the rigid orientation of the filter's side walls.

2. General Background

Most conventional drip type coffee makers utilize a bowl or open mouthed container to hold the coffee grounds. The container is usually slidably retained in position on the coffee maker to receive hot water generated by the coffee maker. A very thin paper of loose weave fiber filter is generally employed to prevent the coffee grounds from being passed through the grounds container. Various means have been devised to insure proper seating of the filter in the grounds container. Especially by generic brand filter manufacturers when trying to adapt the filter to as many different coffee makers as possible. Examples of such attempts to make universal fits are the pleated side walls utilized in most filters.

A problem occurs when a filter does not seat well in the container, becomes bent during storage or on contact with coffee maker. In such cases the grounds are allowed to wash out of the filter or the brewing water is directed around the filter in such a manner as to prevent the proper brewing cycle of the coffee.

Recent art suggest that coffee filter problems have not been solved and new ways are constantly being sought. Examples of the art are disclosed by U.S. Pat. Nos. to Benedict, 4,735,719, Kopp, 4,656,932, Johnstone 4,963,262, Dilorenzo, 4,666,724, Franke et al., 4,885,987, Alvarez, 2,684,624, Anson, 5,064,533 Sandvig, 4,728,425 and McMichael. In each of the prior art cases cited, the apparatus is dependent upon the size and or shape of the grounds container. These devices are inherently bulky, expensive to manufacture, package and display and are not readily disposable. All of the cited prior art assume a downward orentation or molded to conform to the shape of a specific grounds container, unlike that of the present invention.

SUMMARY OF THE PRESENT INVENTION

The present invention provides a means of maintaining the side walls of a paper coffee filter in a proper upright orientation within a coffee grounds container. The instant coffee filter retainer element is comprised of a single substantially flat piece of heat resistant, resilient material having a open central core and a series of fingers radially dispersed around its perimeter. When placed in contact with a paper coffee filter and inserted into the grounds container the fingers are disposed in an upwardly manner. The flexibility of the fingers urge the filter to meet the natural contour of the grounds container. Thus, holding the filter in a secure position for placing the grounds in the container. The added weight of the grounds tend to help maintain the device in the container. Therefore, the size and shape of the grounds container now becomes much less critical. Additional advantages are achieved due to the device's flat configuration. For example the instant coffee retainer can now be manufactured at a fraction of the cost of other such retainers thereby making it economically feasible to dispose of on a routine basis. Although it can be just as easily cleaned and reused. It can be easily packaged and displayed, and is much more versatile, fitting almost all coffee filter grounds containers.

DETAILED DESCRIPTION OF THE PREFERRED EMBODIMENT

Figure 1:
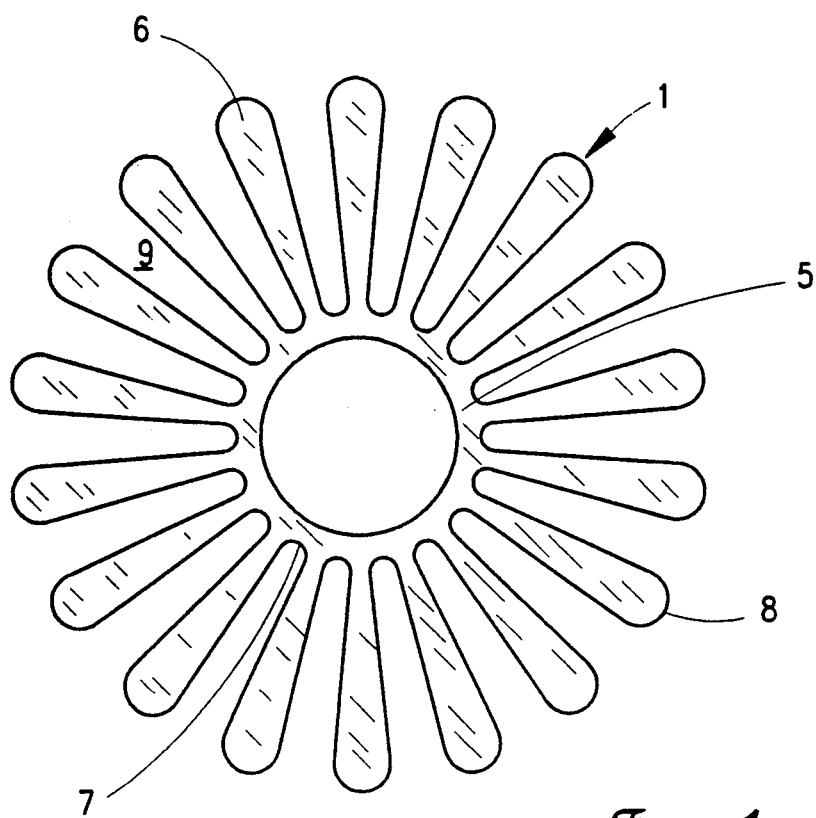
FIG. 1 is a plan view of the invention

The instant invention 1 is constructed of a thin single piece of heat-resistant thermo-plastic material approximately 0.030 inch thick which provides shape retention and resiliency. The preferred embodiment as shown in FIG. 1 comprises an open central core 4 surrounded by an apron 5 having a plurality of rhomboid shaped fingers 6 spaced symmetrically around the periphery and projecting outwardly from the apron 5. A radius gusset 7 is formed between each finger at its juncture with the apron 5. Each finger culminates in a radius 8 at its distal end.

Figure 2:
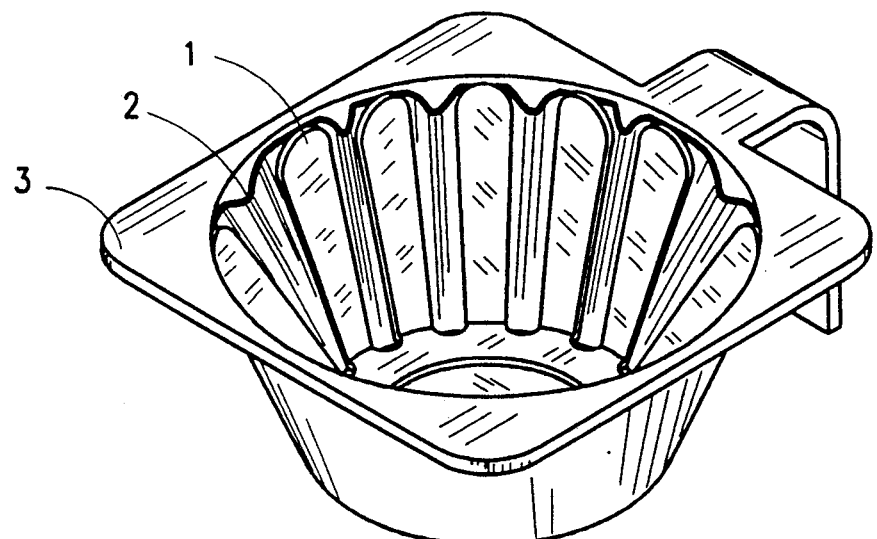
FIG. 2 is an isometric view of a typical coffee grounds container with paper filter and the instant invention in place.

In use the instant invention 1 is placed adjacent a paper filter 2 as shown in FIG. 2 with its open central core 4 at the center of the filter 2 and in combination therewith wedged into a coffee grounds container 3 with the instant invention 1 exposed. Thereby, allowing the inventions fingers 6 to springably compress the paper filter 2 into a conforming shape consistent with the walls of the grounds container 3. Confirmation is achieved due to the flexibility of the independent fingers 6 and tension exerted by the tendency of the material to return to its flat shape. The space 9 between the fingers 6 and the open central core 4 allow for adequate water passage.

What is claimed is:

1. A coffee filter element for supporting the side walls of disposable coffee filters, said element comprising:
   a) an essentially flat, thin, flexible, circular, stamped sheet of thermo-plastic material having an open central core surrounded by an apron; and
   b) a plurality of rhomboid shaped fingers, culminating in a radius at the distal end of each finger, spaced symmetrically around the periphery, projecting outwardly from said apron.

2. A coffee filter element according to claim 1 wherein said element springably compresses the paper filter into a conforming shape consistent with the walls of the grounds container.

3. A coffee filter element according to claim 2 wherein said coffee filter element is placed adjacent a paper filter with its open central core at the center of the filter paper and in combination therewith wedged into a coffee grounds container with said element exposed.

* * * * *